United States Patent
Brown et al.

(10) Patent No.: US 8,047,004 B2
(45) Date of Patent: Nov. 1, 2011

(54) STAVE AND RING CMC NOZZLE

(75) Inventors: John Joseph Brown, Costa Mesa, CA (US); William Preston Keith, Lakewood, CA (US)

(73) Assignee: The Boeing Company, Chicago, IL (US)

( * ) Notice: Subject to any disclaimer, the term of this patent is extended or adjusted under 35 U.S.C. 154(b) by 832 days.

(21) Appl. No.: 12/030,112

(22) Filed: Feb. 12, 2008

(65) Prior Publication Data

US 2009/0199565 A1    Aug. 13, 2009

(51) Int. Cl.
*F02K 1/00* (2006.01)
*F02C 7/20* (2006.01)
*F02C 1/00* (2006.01)

(52) U.S. Cl. .............. 60/770; 60/772; 60/796

(58) Field of Classification Search .......... 60/770, 60/771, 39.5, 796, 772; 239/265.11
See application file for complete search history.

(56) References Cited

U.S. PATENT DOCUMENTS

| | | | |
|---|---|---|---|
| 3,004,385 A | 10/1961 | Spears, Jr. et al. | 60/35.6 |
| 5,039,014 A * | 8/1991 | Lippmeier | 239/265.39 |
| 5,365,661 A | 11/1994 | Mizuno et al. | 29/889.21 |
| 5,584,652 A | 12/1996 | Shaffer et al. | 415/115 |
| 6,136,237 A | 10/2000 | Straub et al. | 264/40.1 |
| 6,758,386 B2 | 7/2004 | Marshall et al. | 228/120 |
| 7,475,547 B2 | 1/2009 | Blanchard et al. | 60/771 |
| 2005/0060984 A1 * | 3/2005 | Prouteau et al. | 60/267 |
| 2005/0097893 A1 * | 5/2005 | Carper et al. | 60/771 |
| 2005/0210861 A1 * | 9/2005 | Bush et al. | 60/204 |
| 2006/0213199 A1 * | 9/2006 | Blanchard et al. | 60/771 |
| 2008/0000235 A1 * | 1/2008 | Hanson | 60/770 |
| 2008/0115484 A1 | 5/2008 | Conete et al. | 60/262 |
| 2009/0019857 A1 * | 1/2009 | Tisdale et al. | 60/770 |

FOREIGN PATENT DOCUMENTS

| | | |
|---|---|---|
| EP | 1 621 751 | 2/2006 |
| FR | 2 875 854 | 3/2006 |

OTHER PUBLICATIONS

PCT Search Report and Written Opinion dated Apr. 29, 2009, 14 pgs.

* cited by examiner

*Primary Examiner* — William Rodriguez
*Assistant Examiner* — Gerald Sung
(74) *Attorney, Agent, or Firm* — Caven & Aghevli LLC

(57) ABSTRACT

An engine exhaust nozzle comprises a plurality of CMC staves attached to one or more support rings arranged axially. The support rings provide a circumferential load path between the staves and for attaching the exhaust nozzle to the metallic engine components. The staves are fixed to the support rings with a spacing intended to accommodate for relative movement due to the difference in CTE for the CMC and metallic components and due to thermal gradients through the wall thickness. The resulting apparatus is lightweight, relieves the nozzle of thermal stresses, and is easier to manufacture and repair.

20 Claims, 7 Drawing Sheets

STAVE AND RING CMC NOZZLE

FIELD

The present disclosure relates to ceramic structures. The disclosure has particular utility in connection with ceramic structures for high temperature applications such as in engines, in particular engine exhaust nozzles, and will be described in connection with such utility, although other utilities are contemplated.

BACKGROUND

Recent advances in ceramic matrix composite (CMC) technology is opening up new applications. Traditionally, these materials have been very costly to produce and had exhibited relatively low strength and toughness. Recent advances have reduced manufacturing costs and improved the strength and toughness of these material systems. These improvements along with the ability of CMCs to perform at elevated temperatures makes the use of CMCs viable for use in aircraft engines and other high temperature applications. CMCs offer the potential for lower weight components and the use of higher operating temperatures than can be achieved with traditional metallic components.

CMC and metallic components that make up an airplane may be subjected to extreme thermal conditions, wherein the structure must be capable of withstanding relatively high thermal loads in a variety of conditions. Parts of the engines, in particular, may be subjected to temperatures in excess of 1300° F. Due to its strength-to-weight ratio and its resistance to thermal stresses CMC materials are increasingly used in such parts. The joining of CMC and metallic components presents a problem, however, as CMCs in general have a much lower coefficient of thermal expansion (CTE) than metals. This results in thermal stresses at joints between the CMC and metallic components, which in turn could lead failure of the CMC component.

One component that is of particular concern is the engine exhaust nozzle. Generally, airplane engine exhaust nozzles have a fixed exit area. In the past the exhaust nozzle has been made of metal, but in the continuing effort to shed excess weight and enable higher gas temperatures, engine exhaust nozzles using CMC materials are now being investigated. Implementing a CMC nozzle faces several challenges. Nozzles are generally made in a single piece. As the engine temperature increases, the metallic engine interface expands at a greater rate than the CMC exhaust nozzle, resulting in thermal stresses that can cause failure of the CMC component. Thermal gradients through the wall thickness also induce high stresses in a continuous hoop (or ring) structure (as an exhaust nozzle) limiting the structural capability. Finally, although CMCs are more resistant to cracking than monolithic ceramics, they are still much more prone to damage than metallic structures.

SUMMARY

According to one aspect of the present disclosure there is provided a combined CMC/metallic nozzle structure that generally comprises a plurality of CMC staves attached to one or more metal support rings arranged axially. This structure will expand readily to minimize thermal stresses due to the differences in CTE between the CMC and metallic components and due to thermal gradients through the wall thickness. The nozzle structure of the present disclosure can easily be repaired if damaged. As applied to an engine exhaust nozzle such as for a jet engine, the support rings provide a load path between the staves as well as a base for attaching the exhaust nozzle to the metallic engine. The staves are fixed to the support rings with a small gap between adjacent staves to accommodate relative movement due to the difference in the CTE of the CMC and metallic components or due to thermal gradients through the wall. A seal is required between staves to substantially eliminate gas flow between staves. This may be accomplished by overlapping the staves, by applying a compliant seal material at the interface, or by a combination of these methods. The resulting nozzle structure is both more viable and less costly to manufacture when compared to a comparably sized single-piece, CMC structure.

According to another aspect of the present disclosure there is provided an engine exhaust nozzle comprising a plurality of staves formed of a ceramic matrix composite material. One end of each of the plurality of staves is attached to the engine, and the plurality of staves are supported in the shape of a nozzle by at least one support ring spaced from the engine end of the staves. For very short staves, a single support ring may be sufficient.

The present disclosure also provides a method of ducting exhaust gases from an engine by attaching to an engine exhaust a plurality of nozzle staves having a coefficient of thermal expansion (CTE) substantially lower than the engine exhaust, in the form of an exhaust duct, such that the exhaust duct has a plurality of ceramic staves having an upper and lower side by side such that the upper lip and lower lip overlap the surface of a adjacent stave, and forms a seal whereby to substantially eliminate aerodynamic flow between adjacent staves.

BRIEF DESCRIPTION OF THE DRAWINGS

The features, functions, and advantages that have been discussed can be achieved independently in various embodiments of the present disclosure or may be combined in yet other embodiments further details of which can be seen with reference to the following description and drawings wherein like numerals depict like parts, and wherein.

DETAILED DESCRIPTION

In the following description, reference is made to the accompanying drawings, which form a part hereof, and in which is shown, by way of illustration, various embodiments of the present disclosure. It is understood that other embodiments may be utilized and changes may be made without departing from the scope of the present disclosure.

Figure 1:
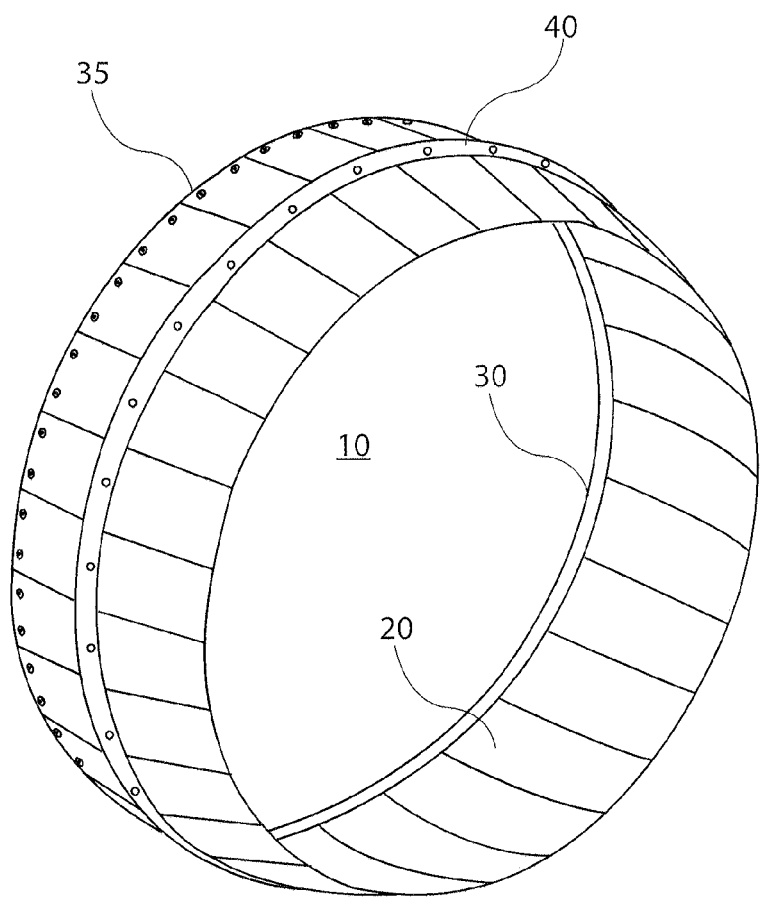
FIG. 1 is an illustration of an engine exhaust nozzle according to a first embodiment.

Referring to FIG. 1, the engine exhaust nozzle 10 generally comprises a plurality of staves 20, each individual stave being connected to two support rings, a forward support ring 30 and a second support ring 40, positioned in parallel. The second support ring is shown in the middle, but it could be located anywhere, including at the aft end of the duct. For shorter staves, the second support ring may be omitted. The staves are formed of a fiber-reinforced ceramic matrix composite (CMC) material in either a solid laminate, sandwich structure or combination of solid laminate and sandwich structure. The rings support the staves and maintain the shape of the nozzle.

Figure 2:
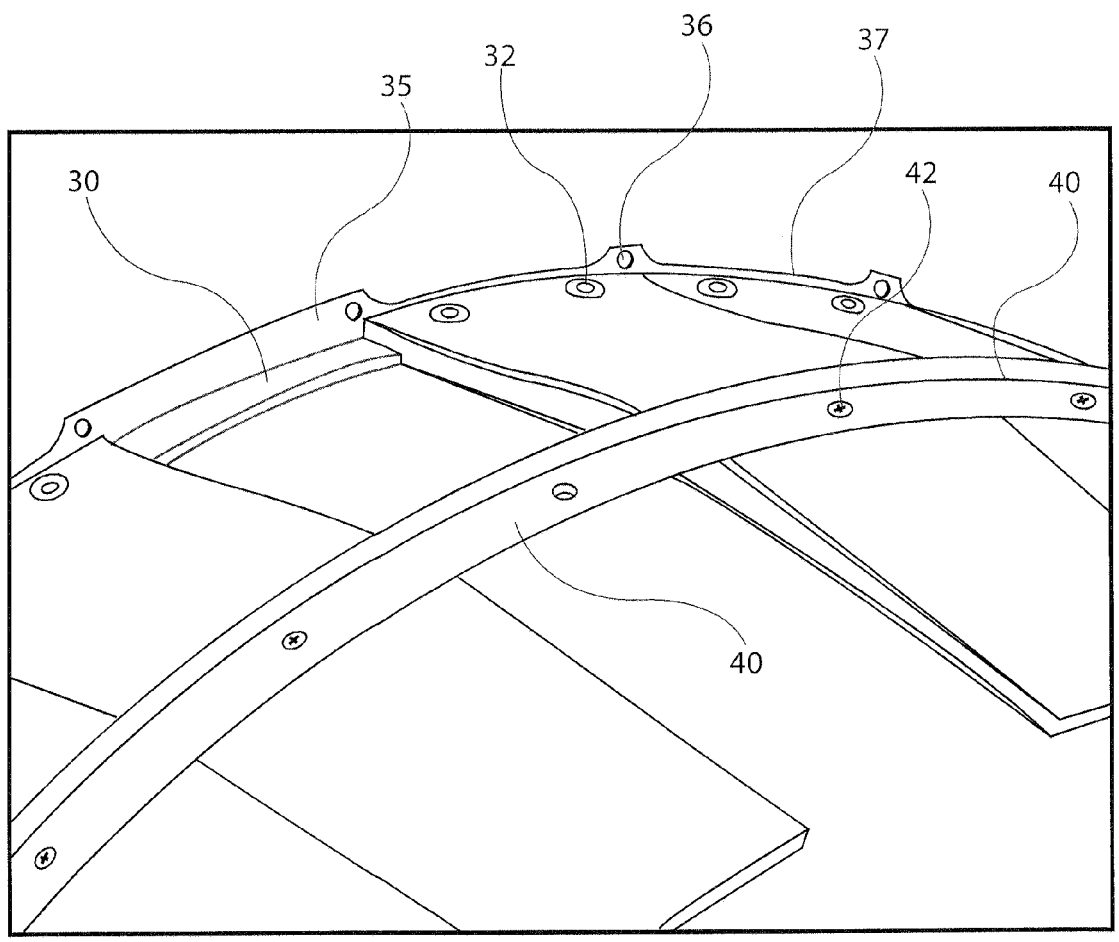
FIG. 2 is an illustration showing the engine exhaust nozzle of FIG. 1 in greater detail.

Referring to FIG. 2, forward support ring 30 includes a fastener assembly 32 for attaching the nozzle to the engine, such as an outwardly extending flange 35. The support rings are spaced from one another at a distance to maximize the structural support to the individual staves. The forward support ring should be made of a material that has a coefficient of thermal expansion (CTE) similar to the material at the engine interface, which in most airplanes is metallic. A preferred material for the support rings is INCONEL®, due to its resilience at high temperatures.

At engine operating temperatures, the thermal expansion of the support rings and the engine interface creates a gap between each stave. The diameter of the engine nozzle, the exhaust temperature, and the materials used are factors on the size of the gap between each stave. For example, an engine having a 60 inch diameter nozzle, wherein the support rings are comprised of INCONEL® and the nozzle is comprised of 28 staves, a rise in temperature from 70° F. to 1300° F. causes thermal expansion of the support rings resulting in a gap of 0.040 inches between each stave. The number of staves should be chosen to balance the overall aerodynamic effect of these gaps, the ability of the seal to prevent leakage between the staves, the structural distribution of loads, and feasibility of manufacturing the individual staves.

FIG. 2 illustrates the exhaust nozzle of the embodiment shown in FIG. 1 with a stave omitted for illustrating a detailed view of the connection between the staves 20 and the support rings 30, 40. In this embodiment, the staves are attached to the outside of forward support ring 30 by one fixed fastener assembly 32 and one slotted fastener assembly 33. The slotted fastener assembly 33 allows the stave to shift its position circumferentially relative to forward support ring 30 as the support ring expands. Forward support ring 30 further includes a fastener assembly for attaching the nozzle to the engine, such as an outwardly extending flange 35 having individual holes 36 which match corresponding holes on the engine body. The attachment may further be facilitated using bolts or other fastener assemblies capable of withstanding large loads at high temperatures. Outwardly extending flange 35 includes several notches 37 to reduce the overall weight of the nozzle.

Alternatively, the fastener assembly of the forward support ring may provided by an inwardly extending rim with holes corresponding to holes on the engine body. Other alternative configurations may exist, including but not limited to fastening the nozzle to the engine body by using fixed fastener assemblies 32.

Second support ring 40 is fastened to the plurality of staves 20 using fixed fastener assemblies 42. The second support ring is positioned parallel to forward support ring 30 at a distance selected to provide maximum structural support for the nozzle. To further increase the amount of stiffness provided by second support ring 40, an outwardly extending rib 45 may be included. Where additional stiffness is necessary, the forward or second support ring may include multiple ribs or be constructed with a cross-section having a "C", "I", "J", "U", or "Z" shape.

Figure 3:
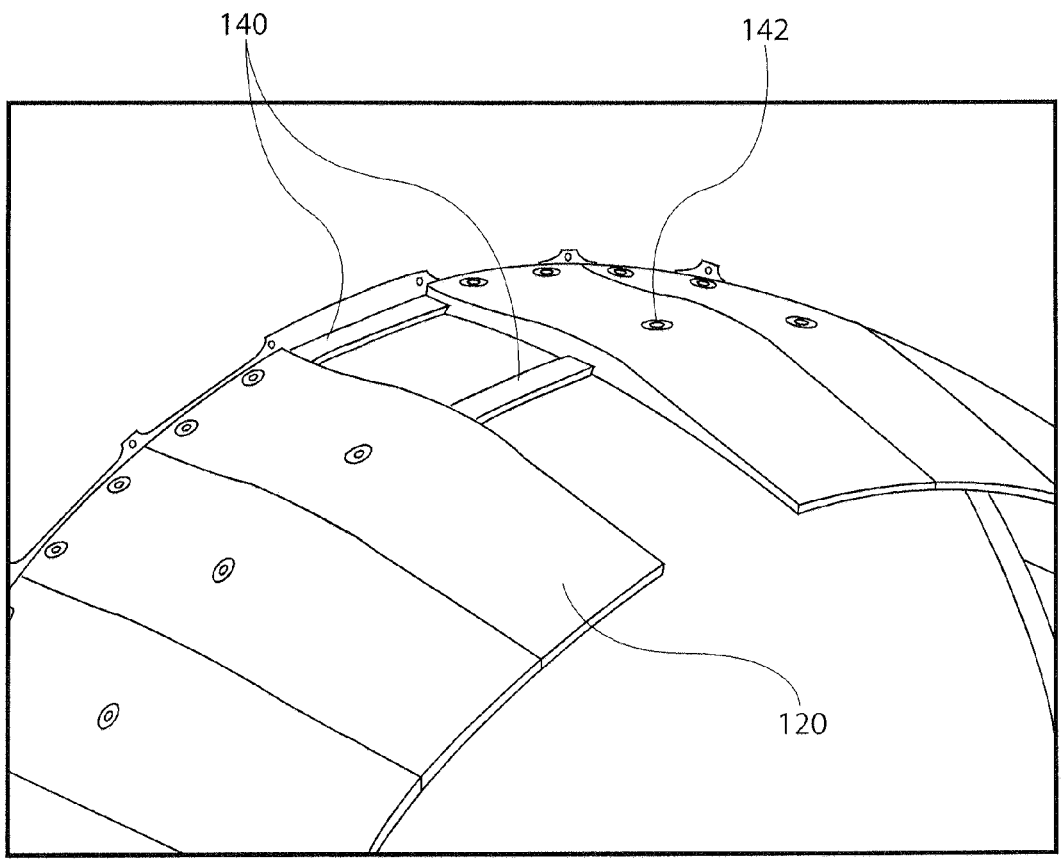
FIG. 3 is an illustration showing an alternative embodiment.

Other arrangements of the support rings are also possible. For example, FIG. 3 shows an alternate configuration wherein the staves 120 are fastened to the outside of second support ring 140. Second support ring 140 is attached by fastener assembly 142 and may include a rib to provide added stability. There may be applications where only one ring is needed, e.g. nozzles that are lightly loaded or relatively short.

Figure 4:
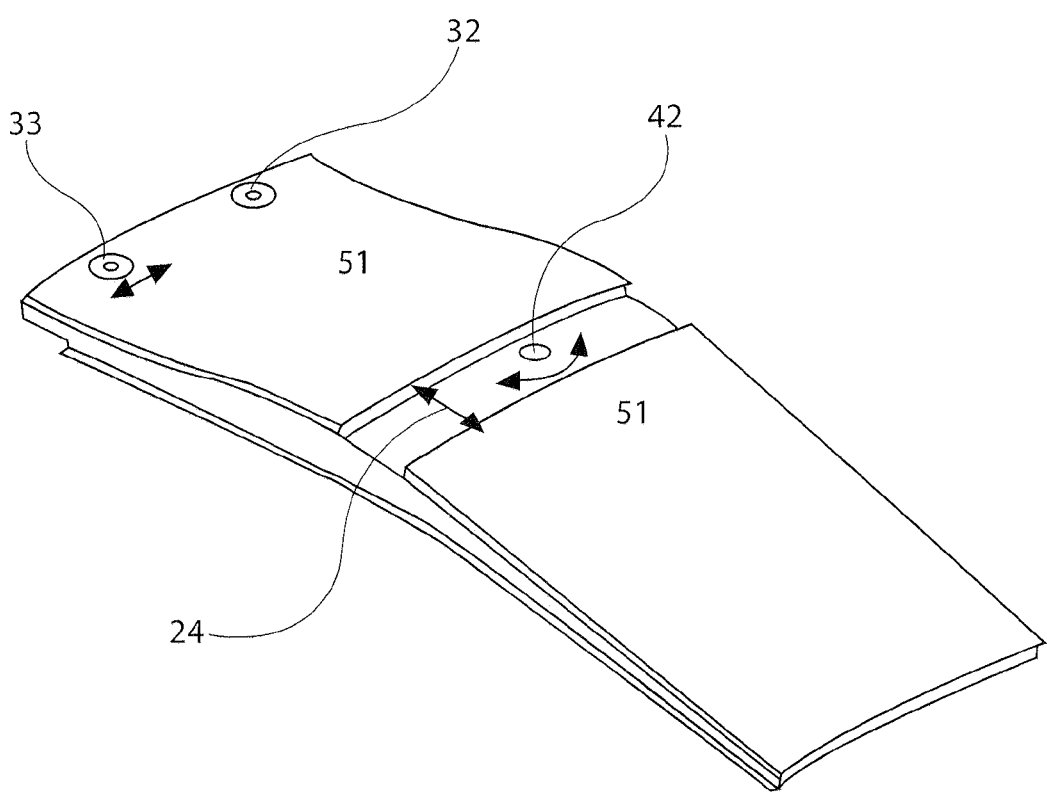
FIG. 4 is an illustration showing an individual stave according to one embodiment.

FIG. 4 shows a detailed view of an individual stave. The individual staves making up a nozzle may be identical in geometry (as shown) or of two distinct geometries (male & female) that are alternated circumferentially. The individual staves have a circumferential curvature that matches shape of the support rings and, in turn, the engine body. The individual staves are also curved in the axial direction to form the desired aerodynamic shape of the nozzle. The staves may be manufactured as solid laminates, as a sandwich construction, or as a combination of solid laminate and sandwich construction to best optimize the structural stiffness and strength relative to the weight and provide acoustic attenuation where needed.

Where the support ring is located on an aerodynamic surface, the stave should include a slot in which the ring may be embedded. The slot width 24 should be wider than the support ring to prevent load transfer to the sides of the slot. Conversely, where aerodynamics is not affected the ring may be located against the stave without a slot.

As the support rings undergo thermal expansion, the staves will move relative to the slotted fastener assemblies 33. The direction of movement will be about the circumference as shown by arrow 50. To prevent further stresses on the staves due to thermal expansion, turbulence, or other phenomenon, the nozzle may be configured to allow slight rotation about fixed fastener assembly 42.

Figure 5:
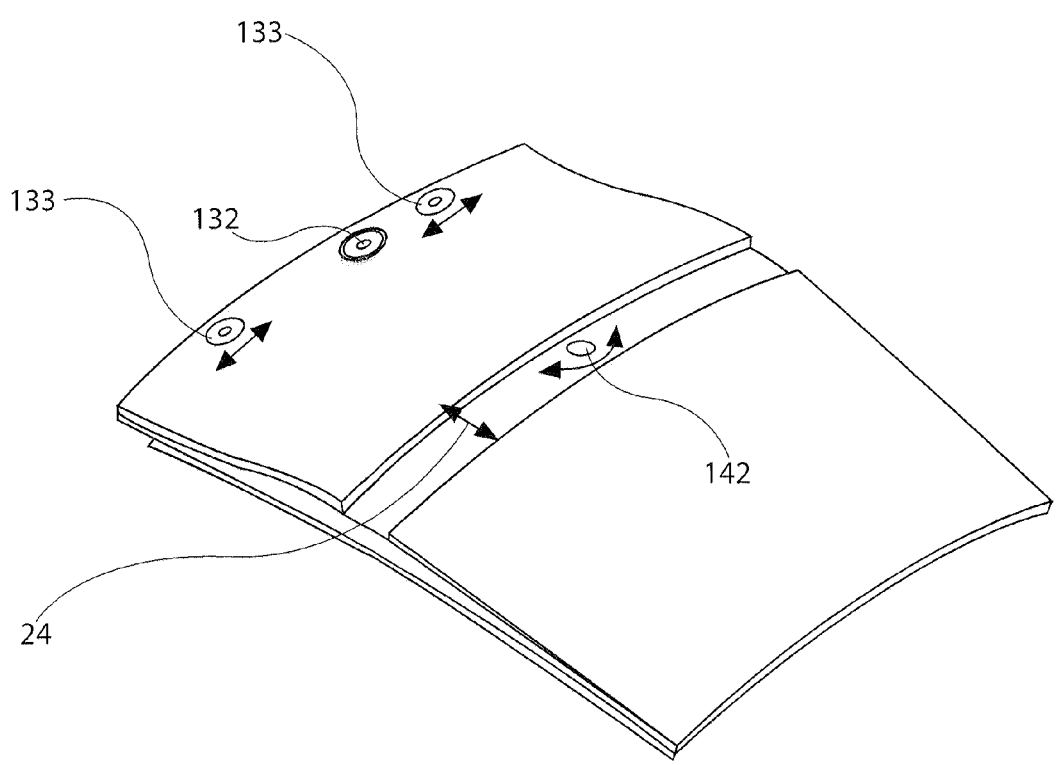
FIG. 5 is an illustration showing an individual stave according to an alternative embodiment.

FIG. 5 shows an individual stave according to an alternative embodiment, wherein multiple slotted fastener assemblies 133 are included to attach to the forward ring. This configuration may be useful in providing stability for wider staves. Each of the slotted fastener assemblies 133 allow some movement in a direction about the circumference as indicated by arrow 150.

Figure 6:
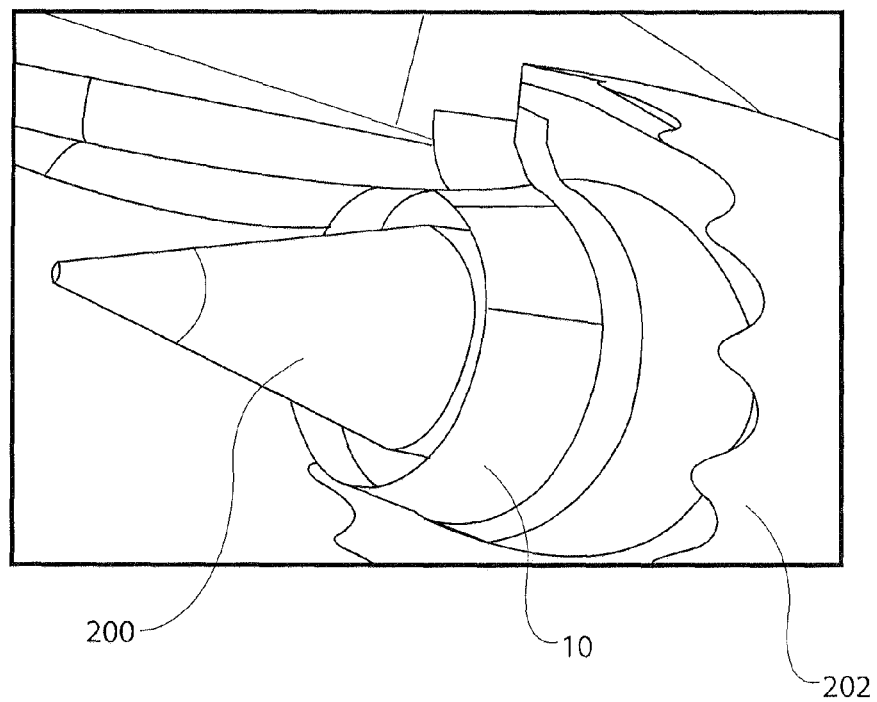
FIG. 6 is an illustration showing a typical metallic engine exhaust nozzle on an engine mounted on an aircraft.

FIG. 6 illustrates a typical metallic engine exhaust nozzle assembled on a jet engine 200 on an airplane 202.

The use of the stave and ring concept has several advantages over both metallic nozzle structures and monolithic ceramic structures. For example, if a single stave begins to crack, that crack will not propagate beyond the single stave. Further, if an individual stave is damaged for any reason, that individual stave can be replaced rather than the entire exhaust nozzle. Moreover, the use of individual staves instead of a single-piece construction CMC exhaust nozzle allows the individual staves to be prepared in smaller ovens than a CMC exhaust nozzle formed as a single piece, thus reducing the overall cost of the CMC component.

Figure 7:
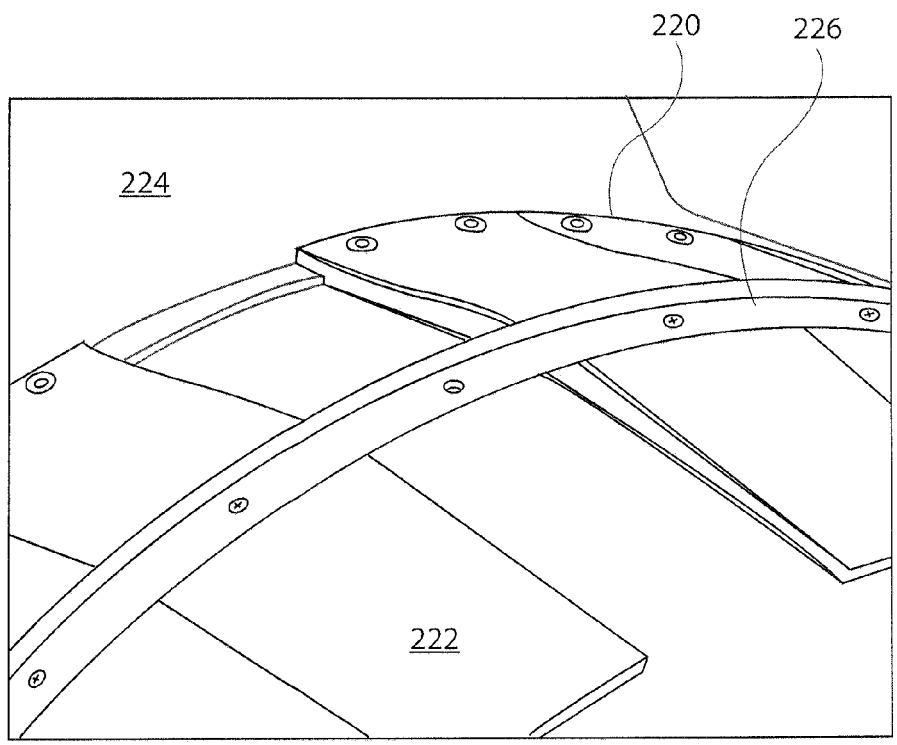
FIG. 7 is an illustration showing yet another embodiment of the disclosure.

It should be emphasized that the above-described embodiments of the present device and process, particularly, and "preferred" embodiments, are merely possible examples of implementations and merely set forth for a clear understanding of the principles of the invention. Many different embodiments of the stave and ring CMC nozzle described herein may be designed and/or fabricated without departing from the spirit and scope of the disclosure. For example, one end 220 the staves 222 could be affixed directly to an engine component 224, e.g., as illustrated in FIG. 7, and supported in the shape of a nozzle by one or more rings 226 spaced from the engine ends of the staves. Also, additional rings may be included in the configuration to provide additional support. In addition, the stave and ring concept disclosed herein may be utilized for purposes other than airplane engines, such as for example, the exhaust nozzles of fixed turbines or other types of propulsion devices including land vehicles including trains, ships as well as rockets and other aerospace propulsion devices. All these and other such modifications and variations are intended to be included herein within the scope of this disclosure and protected by the following claims. Therefore the scope of the disclosure is not intended to be limited except as indicated in the appended claims.

The invention claimed is:

1. An engine exhaust nozzle, comprising:
 a forward support ring and a second support ring downstream of the forward support ring;
 a plurality of staves, wherein one end of each of the plurality of staves is attached to the forward support ring, the plurality of staves forming the shape of the nozzle and:
 an annular groove formed within the plurality of staves to receive the second support ring.

2. The engine exhaust nozzle of claim 1, wherein the forward support ring and the staves are symmetrically arranged about an axis of the exhaust nozzle.

3. The engine exhaust nozzle of claim 1, wherein the engine is selected from the group consisting of a aircraft engine, a rocket engine and a turbine.

4. The engine exhaust nozzle of claim 1, wherein each of the plurality of staves is substantially identical in size and shape.

5. The engine exhaust nozzle of claim 1, wherein the plurality of staves are of two geometries arranged alternately around the circumference.

6. The engine exhaust nozzle of claim 1, wherein the plurality of staves are of solid laminate construction, sandwich construction, or a combination of solid laminate and sandwich construction.

7. The engine exhaust nozzle of claim 1, wherein the forward support ring includes an attachment assembly for attaching to the engine.

8. The engine exhaust nozzle of claim 1, wherein the forward support ring is formed of a metallic material.

9. The engine exhaust nozzle of claim 1, wherein each of the plurality of staves is attached to the forward support ring through a circumferential slotted attachment assembly.

10. The engine exhaust nozzle of claim 1, wherein the staves are formed of a ceramic matrix composite material.

11. The engine exhaust nozzle of claim 1, wherein the second support ring comprises a plurality of ribs to increase a stiffness of the second support ring.

12. The engine exhaust nozzle of claim 1, wherein each of the plurality of staves is attached to the second support ring by a slotted attachment assembly which permits the staves to move in a circumferential direction, and is attached to the forward support ring by a second fixed attachment assembly.

13. The engine exhaust nozzle of claim 1, wherein a seal is created at an interface between adjacent staves by an overlap of adjacent staves or by a seal attached to one of the staves that substantially eliminates aerodynamic flow between adjacent staves.

14. An engine exhaust nozzle comprising:
 a plurality of staves, wherein a first end of each of the plurality of staves is attached to forward support ring, and,
 the plurality of staves comprise an annular groove to receive a second support ring spaced downstream from the first end of the staves.

15. The engine exhaust nozzle of claim 14, wherein the engine is selected from a group consisting of an aircraft engine, a rocket engine and a turbine.

16. The engine exhaust nozzle of claim 14, wherein each of the plurality of staves is substantially identical in size and shape.

17. The engine exhaust nozzle of claim 14, wherein the plurality of staves are of substantially two geometries arranged alternately around the circumference.

18. The engine exhaust nozzle of claim 14, wherein the plurality of staves are formed of a ceramic matrix composite material of solid laminate construction, sandwich construction, or a combination of solid laminate and sandwich construction.

19. The engine exhaust nozzle of claim 14, wherein each of the staves overlaps an adjacent stave to form a seal that substantially eliminates aerodynamic flow between adjacent staves.

20. A method of ducting engine exhaust gases from an engine comprising:
 providing an exhaust duct formed of a plurality of nozzle staves having a coefficient of thermal expansion substantially lower than a component of the engine to which the exhaust duct is attached, wherein the plurality of ceramic staves each have an upper and lower lips positioned side by side such that the upper lip and lower lip overlap the surface of a adjacent stave, to thereby form a seal that substantially eliminates aerodynamic flow between adjacent staves,
 wherein the plurality of staves are mounted via a second continuous mounting ring downstream of a first mounting ring, and
 wherein the staves comprise an annular groove to receive the second continuous mounting ring.

* * * * *